(No Model.) 2 Sheets—Sheet 1.
P. B. DOTY.
SEED PLANTER.
No. 247,806. Patented Oct. 4, 1881.
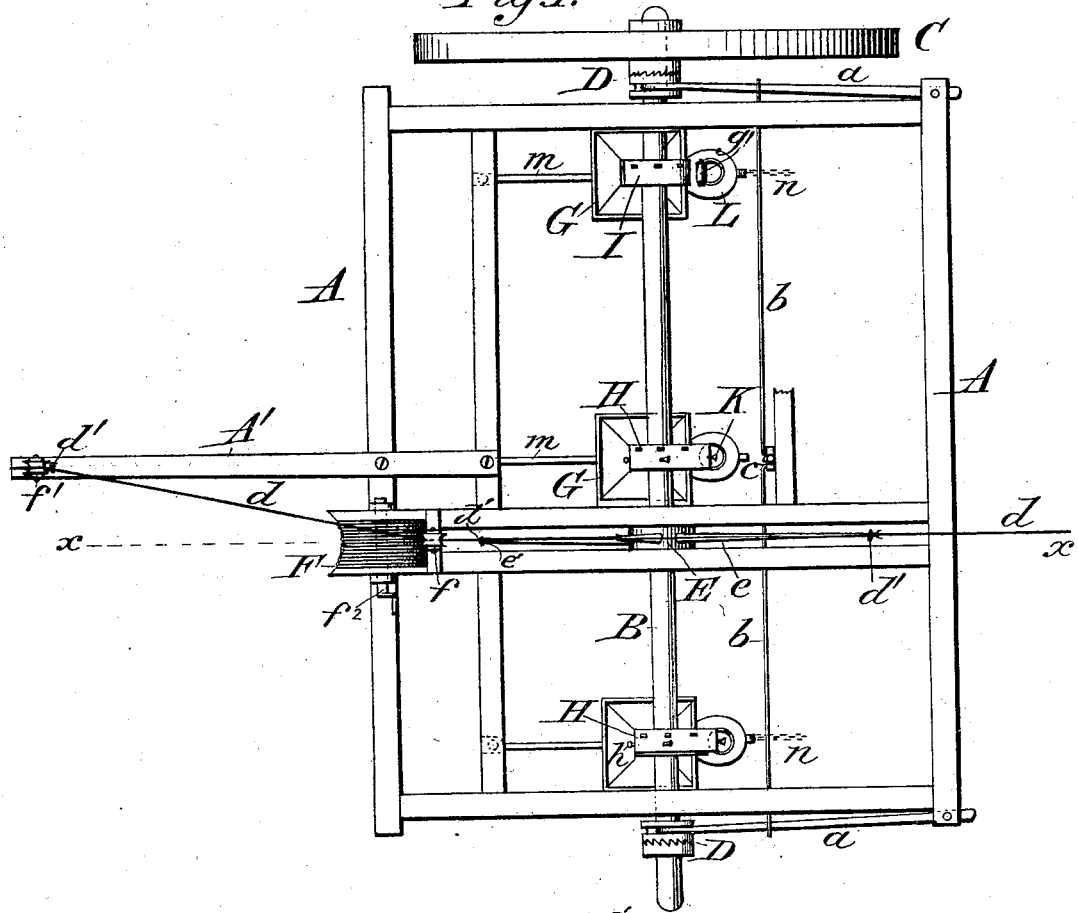
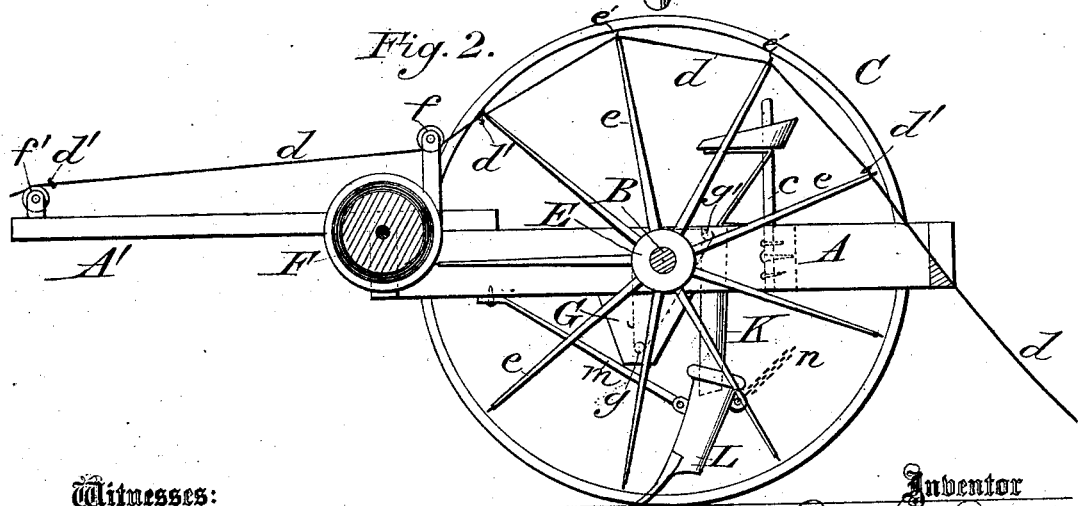
Witnesses:
H. H. Schott
A. R. Brown
Inventor
Peter B. Doty
Per C. H. Watsonrbo. Attorneys.

(No Model.)

P. B. DOTY.
SEED PLANTER.

No. 247,806.

Patented Oct. 4, 1881.

Witnesses:
H. H. Schott.
A. R. Bonn.

Inventor
Peter B. Doty
Per C. H. Watson & Co. Attorneys.

UNITED STATES PATENT OFFICE.

PETER B. DOTY, OF CONNEAUT, OHIO.

SEED-PLANTER.

SPECIFICATION forming part of Letters Patent No. 247,806, dated October 4, 1881.

Application filed February 21, 1881. (No model.)

*To all whom it may concern:*

Be it known that I, PETER B. DOTY, of Conneaut, in the county of Ashtabula and State of Ohio, have invented certain new and useful Improvements in Seed-Planters; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to seed-planters; and it consists in the construction and arrangement of devices, as hereinafter more fully described and claimed.

Figure 3:
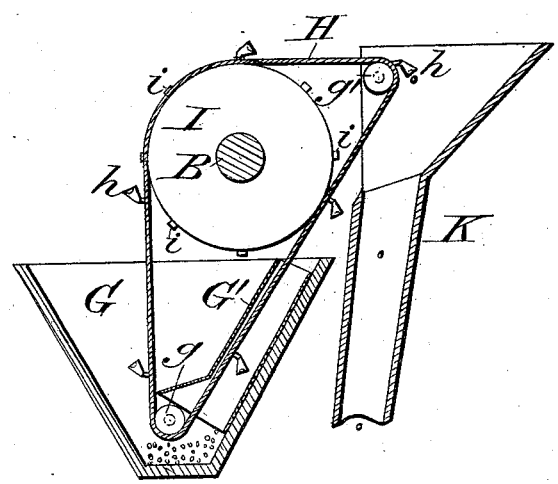
Figure 4:
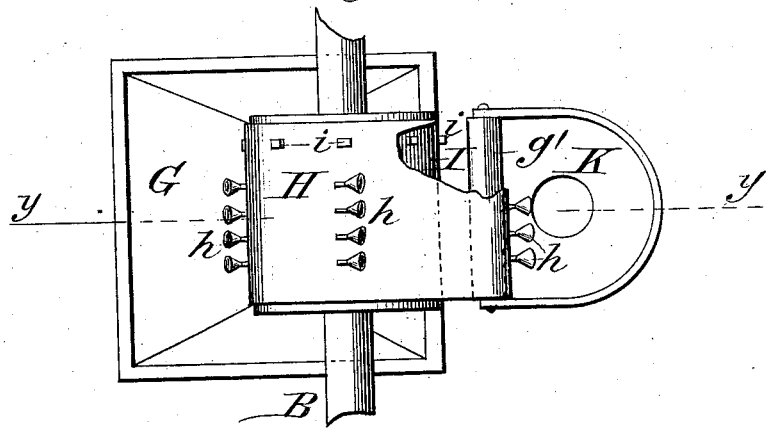

In the annexed drawings, in which similar letters indicate like parts in the several views, Figure 1 is a top or plan view of my machine. Fig. 2 is a section on the line $x\,x$; and Fig. 3 is a section of the seeding mechanism, taken on the line $y\,y$ of Fig. 4, which latter figure represents a top view of the same.

A is the frame of the machine, which is provided with a suitable revolving shaft or axle, B, having wheels C C, that are journaled loosely thereon. Clutches D D are provided, which are connected by pivoted arms $a$ and rods $b$ with a lever, $c$, by which the clutches may be shifted so as to cause the shaft B to revolve with or independent of the wheels C, as may be required.

To the shaft B is keyed a reel, E, having arms $e$, to the ends of which are attached suitable prongs, $e'$, for holding a rope, $d$, that passes under a pulley, $f$, in front of the reel E, thence over a pulley, $f'$, on the pole A', and is finally fastened to a stake at the end of the field, in front of the machine. The other end of the rope $d$ is fastened to a stake at the end of the field, back of the machine.

Attached to the frame A in any suitable manner are the seed-boxes or hoppers G. These boxes are made with inclined sides, being smaller at the bottom, which is closed, than at the open top. At the lower part of each box is a roller, $g$, around which passes a belt, H, which also works over a large roller, I, on the shaft B, and over a smaller roller, $g'$, that is placed on a line with the upper part of the large roller I, and within the funnel-shaped mouth of a spout, K, that leads to the interior of the drill-tooth L.

The endless belt H is provided with seed-cups $h$, arranged in rows at suitable distances apart, and on one edge or side it has a number of openings that engage with spurs $i$ on the roller I. As the roller I revolves with the shaft B it carries with it the belt H, and causes the cups $h$ to gather the grain or seed from the bottom of the hopper and carry it upward and backward to the funnel-shaped mouth of the spout K. The cups $h$ are provided with shanks of suitable length, and are thus arranged on the belt in such a manner as to prevent the grain from becoming wedged between them and the belt. The belt H works through a tube or well, G', that is arranged within the hopper or seed-box, and prevents the seed from getting back of the belt, between it and the small roller $g$.

The drill-teeth L are pivoted to the bars or braces $m$, and may be adjusted to the proper height by means of the chains $n$. As the machine is drawn forward the feeding mechanism is operated by means of the rope $d$, one end of which is secured by a hook to a ring in the end of a stake that is driven into the ground back of the field to be planted, while the other end is secured in a similar manner to a stake at the opposite end of the field. The rope is provided with knots $d'$, that are usually placed about four feet apart. These knots strike against the ends of the arms $e$ and revolve the reel E backward, carrying with it the shaft B, the clutches D being open. In this manner the roller I is caused to revolve the belt H, and thus feed the grain from the seed-box G to the drill-spout K. In passing from the reel E and pulley $f$ the rope $d$ is held from the ground by means of the pulley $f'$, over which it passes. The rope when not in use is reeled upon the drum F by means of the crank $f^2$.

By regulating the dimensions of the endless belt H and the distance from each other of the seed-cups $h$ the grain may be planted in hills at any desired intervals.

Having thus described my invention, what I claim as new, and desire to secure by Letters Patent, is—

1. In a seed-planter, the combination, with the frames A A', having a revolving axle, B, provided with spurred roller I, and wheels C C, of the pronged reel E, pulleys $f f'$, and knotted rope $d$, substantially as and for the purpose set forth.

2. In a seed-planter, the combination, with the frame A, of the revolving axle B, roller I, having spurs $i\ i$, rollers $g\ g'$, seed-box G, having belt-tube G', drill-spout K, and endless belt H, having seed-cups $h\ h$, substantially as shown and described.

In testimony that I claim the foregoing as my own I have hereto affixed my signature in presence of two witnesses.

PETER B. DOTY.

Witnesses:
AUSTIN JENINGS,
JOHN P. RIEG.